(12) United States Patent
Albaugh et al.

(10) Patent No.: US 7,849,130 B2
(45) Date of Patent: Dec. 7, 2010

(54) DYNAMIC SERVICE-ON-DEMAND DELIVERY MESSAGING HUB

(75) Inventors: Virgil A. Albaugh, Austin, TX (US); Messaoud Benantar, Austin, TX (US); Philip Yen-tang Chang, Austin, TX (US); Hari Haranath Madduri, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 2191 days.

(21) Appl. No.: 10/427,097

(22) Filed: Apr. 30, 2003

(65) Prior Publication Data
US 2004/0221005 A1 Nov. 4, 2004

(51) Int. Cl.
*G06F 15/16* (2006.01)
(52) U.S. Cl. ............ 709/203; 709/225; 709/226; 709/231
(58) Field of Classification Search ............ 709/203, 709/226
See application file for complete search history.

(56) References Cited

U.S. PATENT DOCUMENTS

| | | | | |
|---|---|---|---|---|
| 5,933,603 | A * | 8/1999 | Vahalia et al. | 709/225 |
| 6,336,138 | B1 * | 1/2002 | Caswell et al. | 709/223 |
| 6,449,688 | B1 | 9/2002 | Peters et al. | 711/112 |
| 2002/0147823 | A1 * | 10/2002 | Healy | 709/230 |
| 2003/0018547 | A1 * | 1/2003 | Steele | 705/29 |
| 2004/0003101 | A1 * | 1/2004 | Roth et al. | 709/231 |
| 2004/0087336 | A1 * | 5/2004 | Payrits et al. | 455/557 |
| 2004/0148425 | A1 * | 7/2004 | Haumont et al. | 709/236 |
| 2007/0198432 | A1 * | 8/2007 | Pitroda et al. | 705/64 |

* cited by examiner

*Primary Examiner*—Barbara N. Burgess
(74) *Attorney, Agent, or Firm*—Robert H. Frantz; David A. Mims, Jr.; Mark C. Vallone

(57) ABSTRACT

An infrastructure for on-demand service delivery receiving a request for a service to be performed from a service consumer with an information payload; decomposing requested service into essential or primitive functions; dynamically composing a sequence of a plurality of service elements corresponding to the essential or primitive functions to accomplish the service by employing a function call and return decomposition and recomposition paradigm; creating a control header and information payload, the control header encapsulating the sequence; repeatedly dispatching the control header to each service element in the sequence until all service elements have processed the information payload; and returning the processed information payload to the service consumer.

24 Claims, 8 Drawing Sheets

DYNAMIC SERVICE-ON-DEMAND DELIVERY MESSAGING HUB

BACKGROUND OF THE INVENTION

1. Field of the Invention

This invention relates to technologies for delivering on-demand services from one computer system, such as a server, to another computer system, such as a client, and especially to such on-demand delivery over a computer network such as the Internet or an intranet.

2. Background of the Invention

Traditionally, as shown in FIG. 3, client computers (31, 32, 33) communicate with and obtain one or more services (36, 37, 38) from one or more server computers (34, 35) via a computer network (30) such as the Internet or an intranet. The server computer may be a platform such as an IBM e-Server equipped with the IBM WebSphere™ application server suite or similar products; the client computer may be a personal computer with a web browser, another server computer, or a suitably equipped portable telephone or personal digital assistant (PDA) or similar product; and the computer network may be a network such as the well-known Internet, a wide-area network (WAN), a local area network (LAN), or other suitable network running common protocols such as Transmission Control Protocol/Internet Protocol (TCP/IP), wireless application protocol (WAP), or equivalent.

The server-provided services may include electronic messaging such as e-mail and America Online's Instant Messenger ("AIM"), to online banking and financial transactions, ordering of goods and materials, performing credit card authorization and charge posting, making travel reservations, etc.

The services (36, 37, 38) offer by each server (34, 35) are traditionally "fixed", meaning that they are installed or deployed on a server at a particular time, and that from that time forward, they are available for use by the client computers. If changes need to be made to a service, it often must be "taken down" or taken offline, upgraded, and restarted or reinstalled. As such, server system operators, owners and designers must anticipate in advance much of the functionality that will be needed by the clients prior to installing a service.

Further, it has been the business and technical support models of most server operators and technology suppliers to estimate the amount of computing resources needed (e.g. processor speed, memory, persistent storage, communications bandwidth) for a particular set of services running on a given server platform, and to allocate an entire server platform for running the services required. This simplifies maintenance and support, as each server platform is primarily "owned" or "leased" to a single owner, including the services installed on it. If additional computing resources are needed in the future, an owner may authorize upgrading the software services, portions of the server platform hardware, or both. This also simplifies accounting and revenue determinations.

However, as computing platforms have become much more capable (and expensive) in recent years, and as the competitive nature of online services has become a rapidly changing and evolving market, it has become:

(a) less cost effective for individual owners to absorb the full cost of a server platform allocated only to their services;

(b) less predictable as to future server capacity and capabilities which will be required by an owner; and (c) much less desirable to install and uninstall "fixed" or static application programs, servlets, and the like.

As illustrated by FIG. 4, many of these services (36, 37, 38) may include functions which are unique to each service (41, 42, 43, 44, 45), and a few which are similar or identical to other functions (40, 42) in other services. Even though programming is usually approached in a modular methodology today, many of the deployed application programs reuse these functions (e.g. modules, methods, etc.) with the structure or design of the service being relatively static. For example, Function A (40) may be a function to open, read, write, and close a banking ledger file, while Function C (42) may be a function to perform a daily balance and interest calculation. So, Fixed Service 1 (36) may open a ledger file (40); obtain new entries to the ledger using Function B (41) such as electronic fund transfers, charges, checks, etc.; repeat a cycle of calculating a daily balance and interest due (42) and entering new transactions (41); until no further transactions are to be processed (e.g. closing of a reporting period) when the ledger file is updated and closed (40), as shown in FIG. 6. Fixed Service 3 (38) may also need to calculate interest as done by Function C (42), albeit in conjunction with other functions to perform a different service than Fixed Service 1 (e.g. to prepare a tax report on an account or set of accounts).

Some architectures have been developed to allow for services to use functions provided by external programs such as the Common Object Request Broker Architecture (CORBA), as illustrated in FIG. 5. In such an arrangement, each service (36, 37, 38) must be designed with the expectation of using a common object or function (40, 42). During runtime, the service may post a request to an object-request broker (50), which locates an available object, and provides an interface to the needed objects. While this is useful in minimizing the actual code content of each service (by allowing the service to use the code in the common objects), it still requires the designer of each service to anticipate what functions will be needed and when they will be needed in the logical processes of the service, as shown in the example of FIG. 6.

Many technology providers, such as International Business Machines (IBM), have set their business goals to be able to offer "dynamic on-demand" services, which allow sharing of server platform resources across multiple "owners" on a dynamic basis, and which provide greater support for dynamically provisioning services as demands for the functions they provide vary over time.

The delivery infrastructure required by on-demand computing services poses a great deal of challenges and complexity. Foremost of these challenges is the lack of homogeneity as exhibited by the multiple platforms and programming systems that run the components of such service delivery infrastructures. This exacerbates the issue of interoperability, makes it difficult to incrementally add new services to accommodate the dynamic nature and the rapid pace at which those services need to become available.

Additionally, this situation prevents the adoption of a unified model for securing exchanged messages when needed as might be the case when transporting messages over public networks such as the Internet. Exchanged messages communicate on-demand service requests and responses between on-demand service users and the provider of those services, or they may carry information about the necessary service provisioning that takes place within the provider's realm in servicing those requests as well as possibly joining various business partners.

Once an underlying infrastructure is developed for provisioning, deploying, and executing such on-demand services, proper accounting methods may be employed to allow for more granular methods of revenue generation, cost sharing, and usage tracking. For example, if a service can be dynamically deployed for a banking service only as clients request the service, the bank can avoid paying for unused resources (e.g. unused processor time, memory, disk space, communications bandwidth, etc.) during periods of low or no use of the service, and other owners of services may be provided the unused resources for their burgeoning service requirements (e.g. a travel service may be experiencing peak demand for reservation actions). The technology provider, such as IBM, may then dynamically share computing resources (hardware and software) among multiple service owners, receiving revenue for services based upon appropriate models such as a base fee plus a metered usage fee.

Therefore, there is a need in the art for a uniform and a dynamic service request and delivery infrastructure that addresses the challenges of industry interoperability and complexity of service scalability, which avoids the static or fixed nature of service design, and which supports metered accounting for enhanced revenue generation and cost sharing.

BRIEF DESCRIPTION OF THE DRAWINGS

The following detailed description when taken in conjunction with the figures presented herein provide a complete disclosure of the invention.

SUMMARY OF THE INVENTION

Embodiments according to the present invention solve problems regarding providing a uniform and a dynamic service request and delivery infrastructure that addresses the challenges of interoperability, securing, code design and maintenance, and complexity of service scalability by receiving a request for a service to be performed from a service consumer with an information payload; decomposing requested service into essential or primitive functions; dynamically composing a sequence of a plurality of service elements corresponding to the essential or primitive functions to accomplish the service by employing a function call and return decomposition and recomposition paradigm; creating a control header and information payload, the control header encapsulating the sequence; repeatedly dispatching the control header to each service element in the sequence until all service elements have processed the information payload; and returning the processed information payload to the service consumer.

DESCRIPTION OF THE INVENTION

The present invention is preferrably realized as part of or in conjunction with a computing platform such as a web server, personal computer, or portable computer. Therefore, it is useful to review computing platform generalities, any of which may be suitable for realization of the present invention. It is anticipated that certain mobile and miniaturized computers such as palm-top computers, Personal Digital Assistants, and web-enabled wireless telephones will likely be capable of being utilized with the present invention today or in the near future, as their capabilities are rapidly increasing similarly to those of larger format computers such as personal computers and enterprise servers.

Computing Platforms in General

The invention is preferably realized as a feature or addition to the software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices. In time, it is reasonable to expect the computing capabilities of such portable devices to reach that which is necessary for running sophisticated application programs, migrating programs, and even developing programs.

Therefore, it is useful to review a generalized architecture of a computing platform which may span the range of implementation, from a high-end web or enterprise server platform, to a personal computer, to a portable PDA or web-enabled wireless phone.

Figure 1:
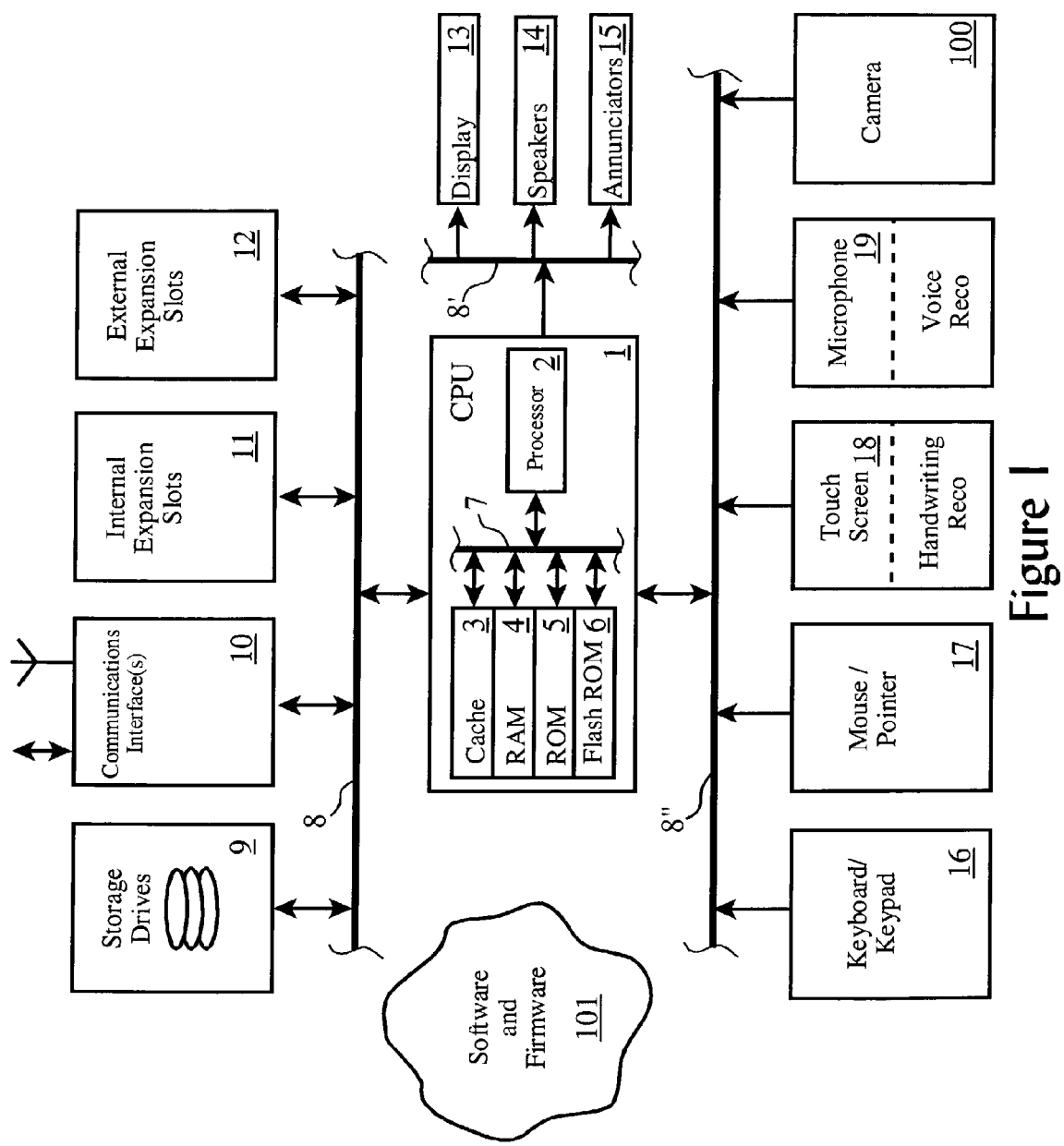
FIG. 1 provides a general view of a computing platform as applicable to a computer providing a service (e.g. a server) or a computer using a service (e.g. a client).

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc.

The computing platform is also provided with one or more software and firmware (101) programs to implement the desired functionality of the computing platforms.

Figure 2:
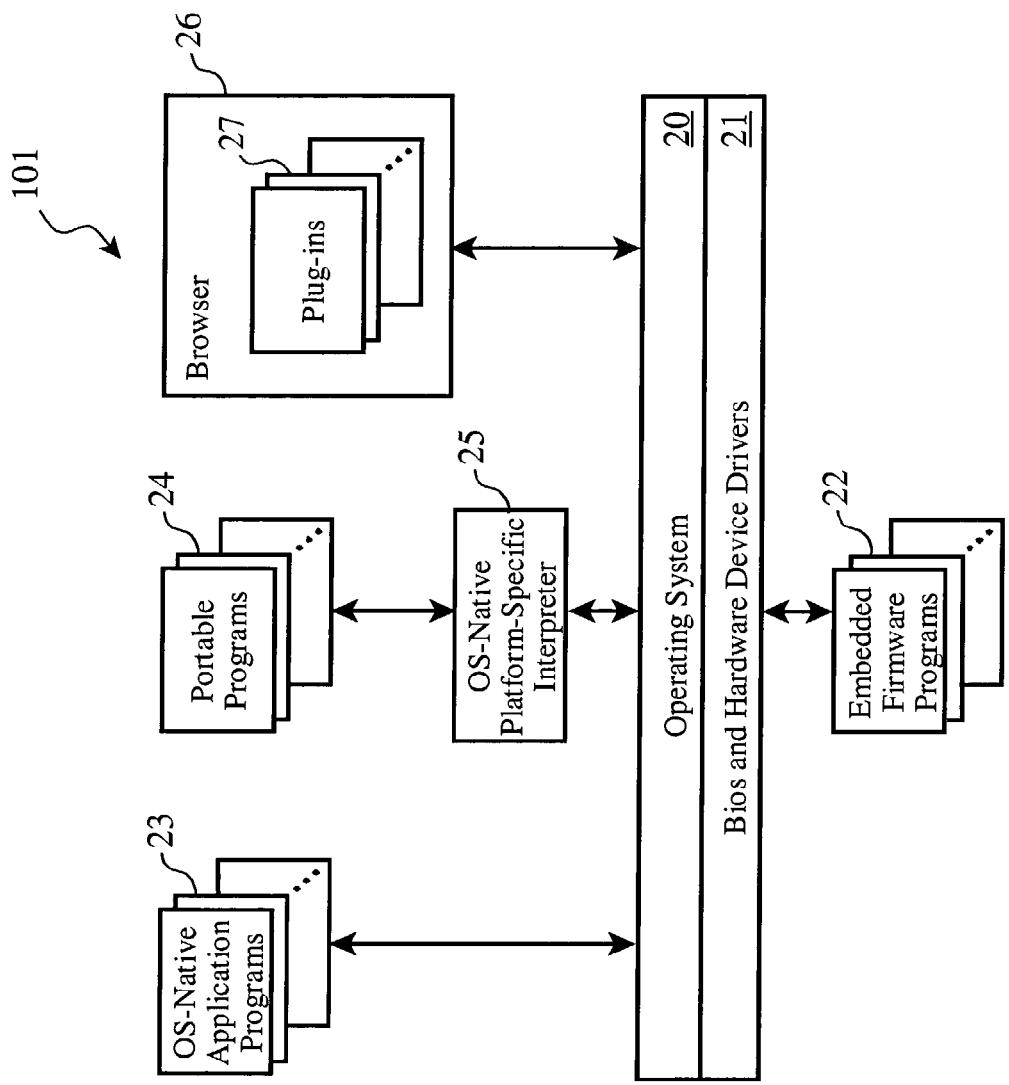
FIG. 2 provides a generalized view of the software organization and components of a typical computing system as disclosed in FIG. 1.
Figure 3:
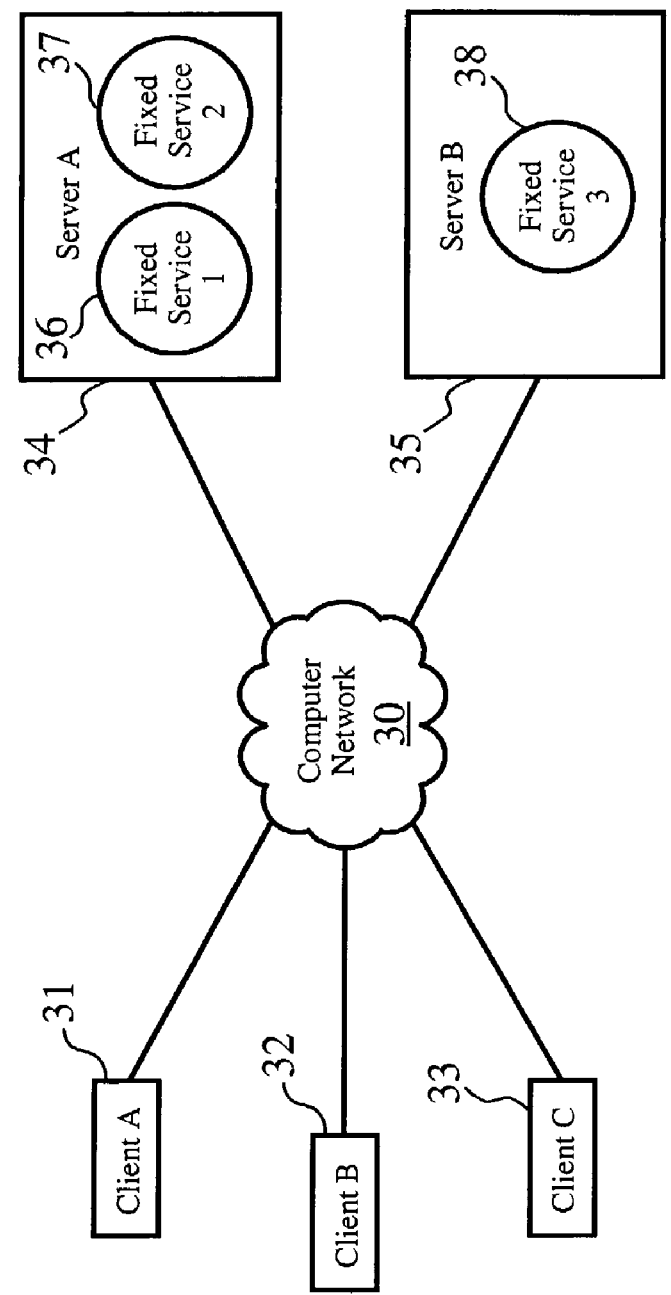
FIG. 3 illustrates a typical service provider arrangement between a service consumer computer (e.g. a client), service provider computer (e.g. a server), and a computer network.
Figure 4:
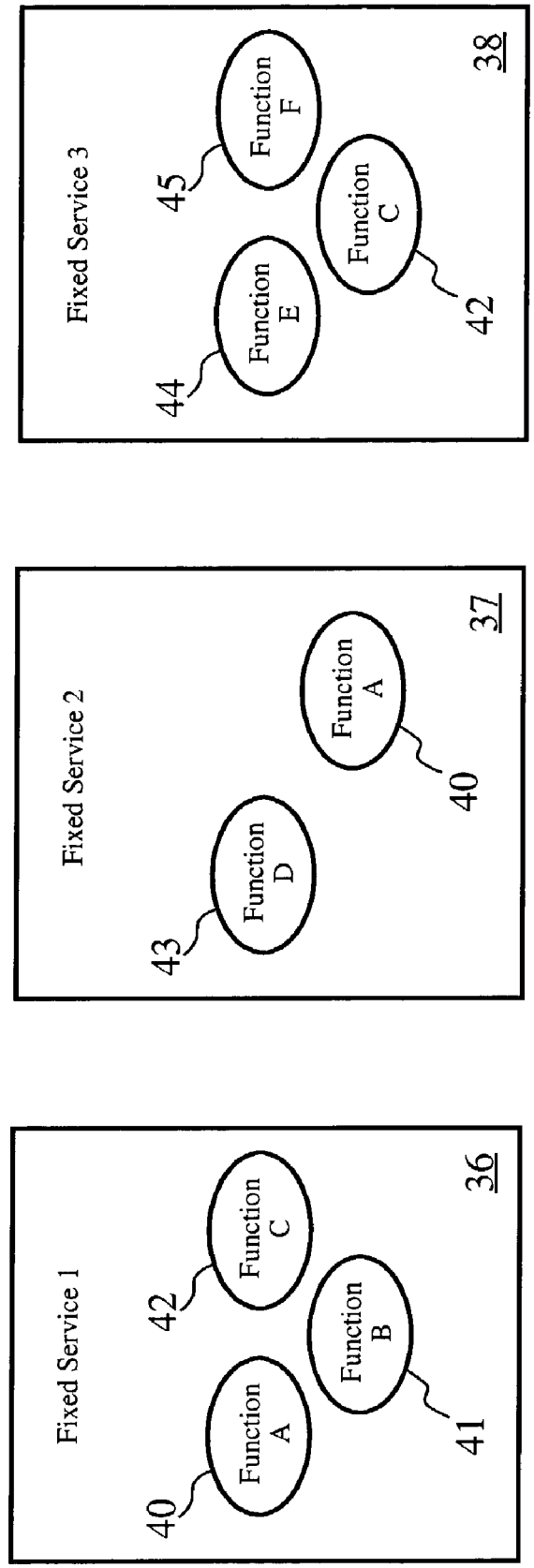
FIG. 4 illustrates the general functional organization of "fixed" online services.
Figure 5:
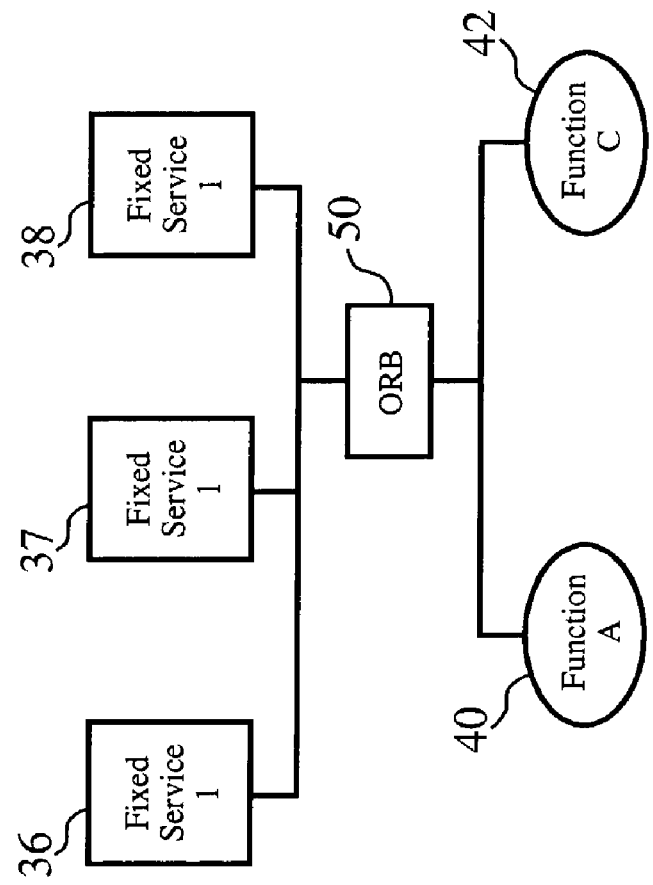
FIG. 5 provides a high-level view of object request brokering architectures which are well-known in the art.
Figure 6:
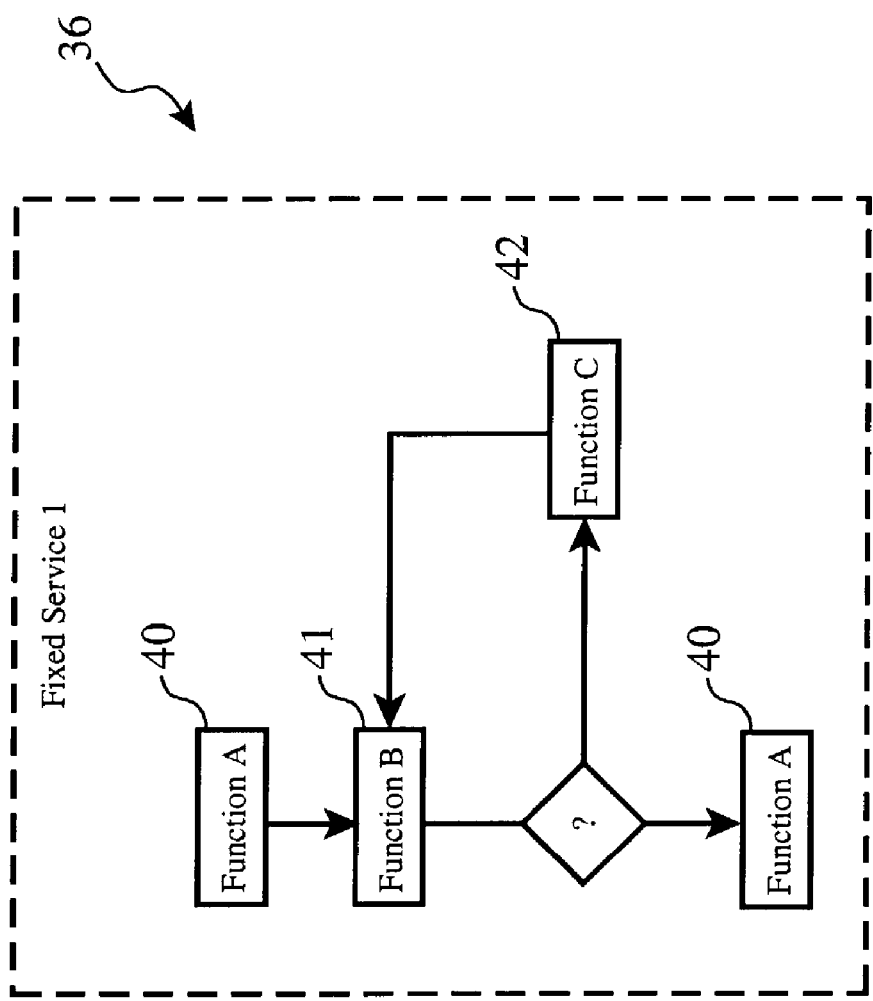
FIG. 6 provides a illustrative logical flow of a hypothetical service using multiple functions.

Turning to now FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java™ scripts and programs.

Often, computing platforms are also provided with a form of web browser or microbrowser (26), which may also include one or more extensions to the browser such as browser plug-ins (27).

The computing device is often provided with an operating system (40), such as Microsoft Windows™, UNIX, IBM OS/2 ™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Our On-Demand Services Infrastructure

According to our new method and system, all the service elements of an on-demand service delivery infrastructure are viewed in a homogenous fashion. Each element is abstracted in the same manner by a messaging and service composition hub that provides a set of on-demand services to users.

One possible entry point for the services on-demand is an Internet portal to the provider. Behind the portal lays a messaging and composition hub infrastructure which interacts with the components delivering various service elements.

The unified view of these service components is formed by way of adopting a canonical messaging scheme as an interface. Each service element is associated with an input queue for storing request pending its service.

Individual service elements are unaware of one another's existence, and are only driven by the dispatcher component of the infrastructure. Our messaging interface makes the location of each service element completely transparent. As such, the dispatcher treats local or remote service elements, such as those located over the Internet, all in the same manner. Service elements become identifiable with Uniform Resource Identifiers ("URI") that implement our queue registration/deregistration procedures.

Among the unique advantages and features of our new system and method are:
  (a) the flexibility and the ease with which new service elements can be added or removed from our infrastructure;
  (b) the dynamic nature of composition of service elements together in order to compute a requested business function;

(c) the uniform view of all the service elements by the brokering hub;

Our new on-demand service infrastructure employs a unique process of dynamically (e.g. on-demand) composition of multiple registered service elements together in a sequence or logical organization which can compute a requested business function in a manner that renders each service element equivalent to an "old style" encapsulated or "fixed" procedure in common high level programming. This promotes code reuse, code stability, minimized code size, and minimizes the need for service designers to anticipate every possible high level business service that may be requested in the future. The dynamic composition of a requested service is developed intelligently by our hub using a rule-based data store.

Our uniform view of all the service elements by the system hub allows the service elements to join the hub when they are automatically discovered by the hub, or then service elements themselves initiate requests to join the hub. This is accomplished through web-services discovery and publishing mechanisms. Requests for registering new services with the hub preferably follow the same, well-known flow as for any other business-related service requests.

A new service element registration request carries that service element's attributes information. For instance, the attributes may indicate the protocols which a service element supports for service delivery such as Hyper Text Transfer Protocol (HTTP), Simple Mail Transmission Transfer Protocol (SMTP), File Transfer Protocol (FTP), and the input data types that it accepts or requires.

Figure 7:
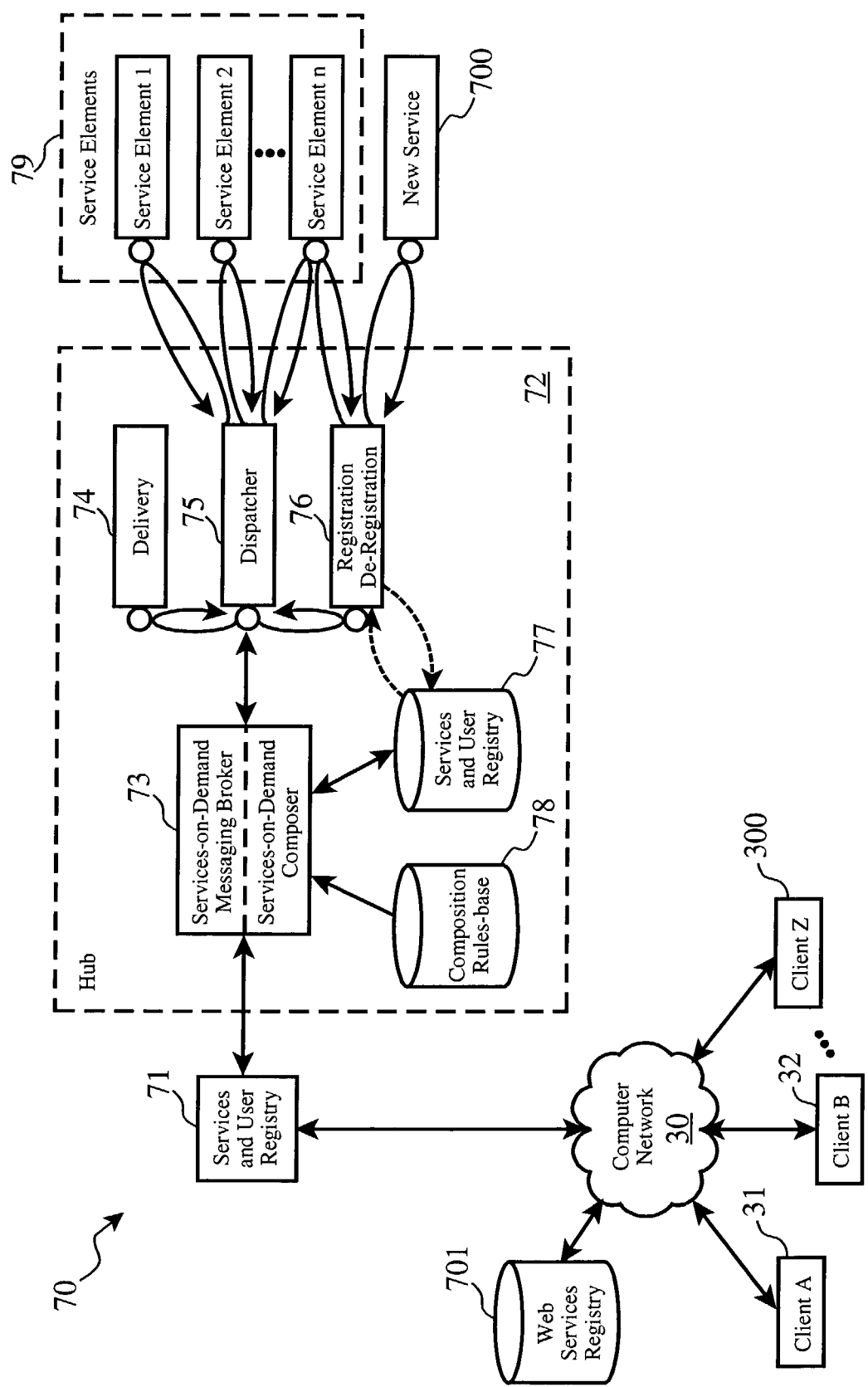
FIG. 7 shows the organization and interactions of the components of our new infrastructure for providing on-demand services.

Turning to FIG. 7, an overview of our system (70) is shown, in which multiple client systems (31, 32, 300) may, via a portal (71) and computer network (30), access services composed by the system's Hub (72).

The registration/de-registration service (76) is used by the dispatcher (75) to queue service registration and de-registration requests. A user and service element registry (77) is used by the registration element (76) to record available service element functions, and by the composer (73) to determine a sequence of service element functions to employ in achieving a requested business function.

A unique aspect of the our service delivery infrastructure is that the core infrastructure services that are part of the Hub (72), such as the dispatcher (75) and the registration/de-registration service (76), are treated uniformly like all other service elements (79) that contribute to the delivery of business functions to client systems.

The delivery service element (74) is responsible for delivering the final output from all the transformations applied on the request to the client system that originated the request, or to a destination partner. The delivery service element (74) preferably supports a superset of major transport protocols such as FTP, HTTP, WAP, SMTP, etc.

Service request messages received by the Hub (72) from a client system via portal (71) are first routed to the message queue for the dispatcher component of the messaging hub. The dispatcher forms an appropriate control header, preferably in Extensible Markup Language (XML), encapsulating the composition of various service elements needed to fulfill the request, then routes it to the next service element for processing.

The pseudo-code shown in Table 1 depicts the logical process performed by the dispatcher component of the messaging hub in response to a user request.

TABLE 1

Pseudo-code for Logical Process of Dispatcher

"sniff" the request to determine the type of service requested;
compose service elements needed to service the request;
for each service element:
    fetch the input parameters needed for its activation;
    do {
        dispatch to current service element;
    { while (service list is not empty)

First, the service request from the client is examined (e.g. "sniffed") to determine the type of service which is requested. Next, a service call paradigm similar to the well-known "function call" is employed by the composer (73) according to a rules-base (78) to decompose the request into essential or primitive functions, and then to create a sequence of functions available from the registered service elements is composed.

Then, for each service element which is needed to perform a function, the input parameters required for its activation are fetched (from the client's request or from other sources such as data files associated with the client), and each service element is dispatched in order.

Table 2 shows the general process of each service element in which the service parameters (e.g. pointers to files, logical controls, input values, etc.) are extracted from the message received from the dispatcher, the message payload is processed according to the needed function, and the service element's definition is deleted from the control header (thereby removing it from the sequence of functions to be done). This is passed back, then, to the dispatcher's messaging queue.

TABLE 2

Pseudo-code for General Process of Service Element

// each service element performs:
    extract service parameters;
    apply service to message payload; // perform function on data
    remove this service definition from control header;
    put the new control header in the dispatcher queue;
    return to dispatcher queue;

The flexibility and the dynamic nature of our infrastructure as shown in FIG. 7 is exhibited by:

(a) the complete location transparency of the service elements (79); and (b) by the ease at which a new service element (700) can be integrated (e.g. registered) into the infrastructure or removed from it.

The insertion of a service element (79) (or the function it performs) in a user request is represented in the control header by an XML element which in turn encapsulates the necessary input data needed by the service element to apply its service to the user request.

The dispatcher component (74) of the Hub (72) invokes the next service element on the list upon completion or return of the request from the previously invoked service element. Conversely, each service element removes its entry from the control header when it completes processing. The syntax that defines the insertion of services into the control header is preferably specified by a fixed XML schema, such as the example given in Table 3 wherein a sender, receiver, process and payload are specified.

TABLE 3

Example XML Control Header

```
<Root>
    <Message_Key>MessageID</Message_Key>
    <Destination>IDDX</Destination>
    <MSG_FORMAT>EDI</MSG_FORMAT>
    <SENDER>SOMEBDY</SENDER>
    <RECEIVER>JOE.DOE</RECEIVER>
    <PROCESS>
        <SERVICE NAME="TRANSLATION">
        <SERVICE_DATA>All of the service in/out parameters
        </SERVICE_DATA>
        </SERVICE>
    </PROCESS>
</Root>
```

A composed set of service elements (corresponding to an external request) automatically detects service elements that need to be scheduled concurrently and those that need to be scheduled sequentially as might be the case in workflow related tasks.

Figure 8:
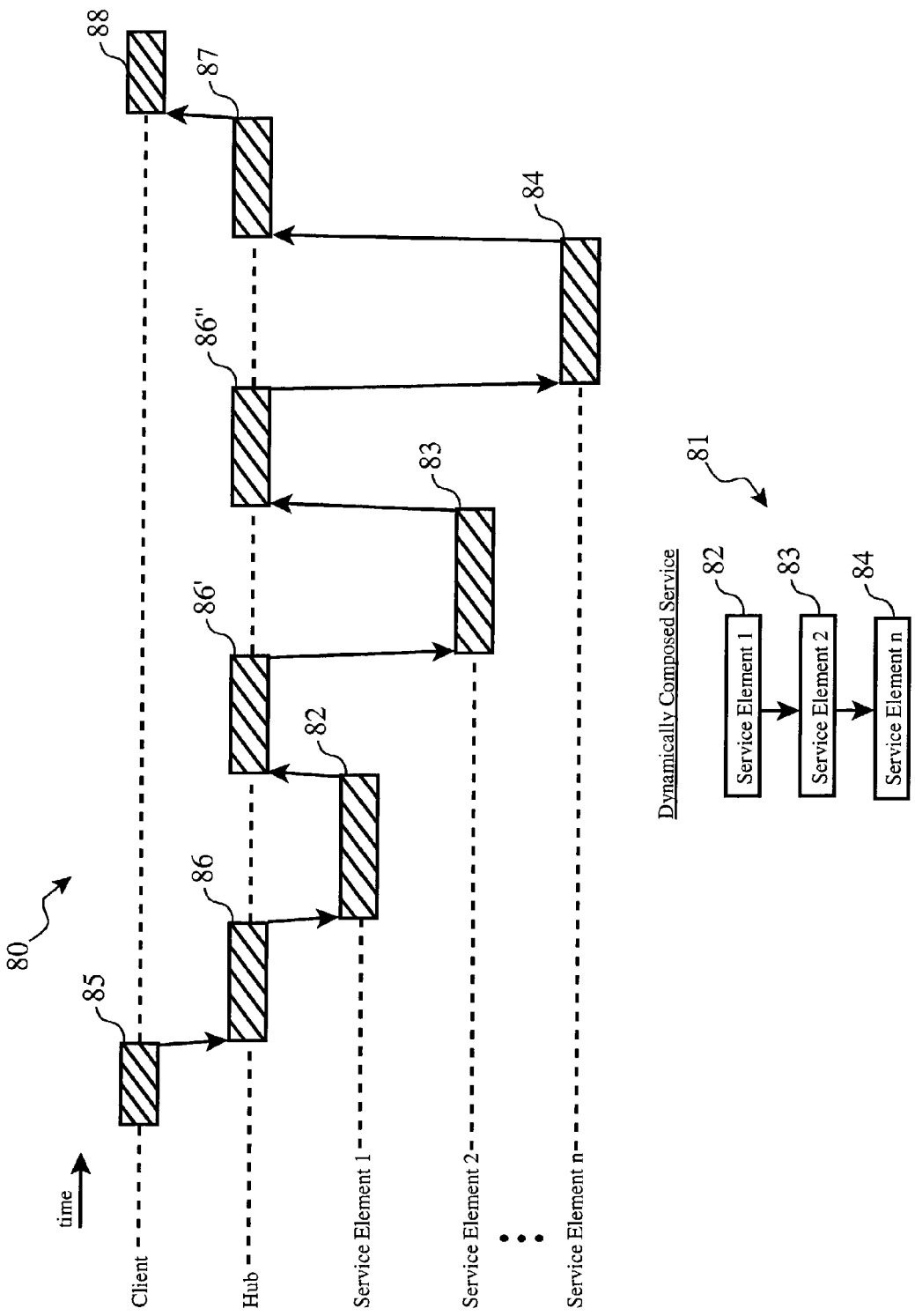
FIG. 8 represents a timeline of organized executions of service elements according to the present invention, the sequence of which having been dynamically composed in response to a request for service from a client.

Turning now to FIG. 8, the processing and interactions of the client, hub, and service elements are shown from a different perspective. In this view, each horizontal bar (hatched box) represents some amount of processing time (not shown proportionally), with time progressing from left to right of the graph (80). Initially, a client posts (85) a request for a service, which is dynamically composed (86), and a first service element is dispatched and executed (82).

Following completion of the first service element's processing, the modified XML control data is returned to the dispatcher, which then dispatches (86') the second service element for its processing (83). This process of communications between the dispatcher and service elements continues until a final service element's processing (84) has been completed. Upon completion, the hub the prepares and returns (87) the results of the service to the requesting client, which receives (88) the results.

For reference and comparison, FIG. 8 also shows the virtual service (81) which has been realized in this example in a form which is more familiar for "fixed" or static application programs.

One possible embodiment of the present invention is as a set of application logic and data stores running on a IBM eServer computing platform with an IBM operating system (e.g. AIX, OS/2, Linux, etc.) with the IBM WebSphere Application Server software suite. The application logic for the infrastructure hub may be developed using any capable language and methodology, such as Sun Microsystem's JAVA™. Client computing platforms may be equipped with a suitable operating system (e.g. Linux, MS Windows™, Palm OS™, etc.), and a suitable web browser program (e.g. Netscape's Navigator™, MS Explorer, etc.).

It will be readily apparent to those skilled in the art that the present invention can be employed in a wide variety of computing environments and applications without departing from the spirit and scope of the invention, including but not limited to use of alternate programming languages, methodologies, server suites, etc. Therefore, the scope of the present invention should be determined by the following claims.

What is claimed is:

1. A method performed by a computing platform comprising:

receiving by a computing platform a request for a service to be performed from a service consumer, the request having an information payload upon which the requested service is to be performed;

responsive to receipt of the request:

decomposing by a computing platform the requested service into a plurality of essential or primitive functions;

dynamically composing by a computing platform a sequence of a plurality of service elements corresponding to the plurality of essential or primitive functions to be employed to accomplish the service, wherein the composing employs a function call and return decomposition and recomposition paradigm;

creating by a computing platform a control header and information payload, the control header encapsulating the sequence of the plurality of service elements;

repeatedly dispatching by a computing platform the control header to each service element in the composed sequence until all service elements have processed the information payload; and responsive to the dispatching so all service elements, returning the processed information payload to the service consumer.

2. The method as set forth in claim 1 wherein the control header comprises an Extensible Markup Language data structure.

3. The method as set forth in claim 1 wherein the step of receiving a request comprises receiving a request via a canonical messaging interface.

4. The method as set forth in claim 1 wherein the step of dispatching the control header comprises dispatching via a canonical messaging interface.

5. The method as set forth in claim 1 further comprising:

maintaining a registry of service elements and the functions; and upon receipt of a deregistration request from a registered service element, removing the registered service element from the registry such that the service element will not be used in subsequently composed services.

6. The method as set forth in claim 1 further comprising providing a hub having a messaging broker, a dynamic service composer, a service element registry, a delivery element, a dispatcher element, and a registration element.

7. The method as set forth in claim 6 wherein the dispatcher element and the delivery element are provided with a canonical messaging interface.

8. A computer readable memory medium for providing services from a service provider to a service consumer comprising:

at least one computer readable memory suitable for encoding program instructions for a processor; and a plurality of program instructions encoded by the computer readable memory:

a first program instruction receiving a request for a service to be performed from a service consumer, the request having an information payload upon which the requested service is to be performed;

a second program instruction, responsive to receipt of the request:

decomposing by a computing platform the requested service into a plurality of essential or primitive functions;

dynamically composing a sequence of a plurality of service elements corresponding to the plurality of essential or primitive functions to be employed to accomplish the requested service, wherein the composing employs a function call and return decomposition and recomposition paradigm;

a third program instruction creating a control header and information payload, the control header encapsulating the sequence of the plurality of the service elements;

a fourth program instruction repeatedly dispatching the control header to each service element in the composed sequence until all service elements have processed the information payload; and a fifth program instruction responsive to the dispatching so all service elements, returning the processed information payload to the service consumer.

9. The computer readable memory as set forth in claim 8 wherein the creating a control header comprises creating an Extensible Markup Language data structure.

10. The computer readable memory as set forth in claim 8 wherein the receiving a request comprises receiving a request via a canonical messaging interface.

11. The computer readable memory as set forth in claim 8 wherein the dispatching a control header comprises dispatching via a canonical messaging interface.

12. The computer readable memory as set forth in claim 8 further comprising:
a sixth program instruction maintaining a registry of service elements and the functions; and
a seventh program instruction, upon receipt of a deregistration request from a registered service element, removing the registered service element from the registry such that the service element will not be used in subsequently composed services.

13. The computer readable memory as set forth in claim 8 further comprising an eighth program instruction having a messaging broker, a dynamic service composer, a service element registry, a delivery element, a dispatcher element, and a registration element.

14. The computer readable memory as set forth in claim 13 wherein the dispatcher element and the delivery element comprise program instructions for a canonical messaging interface.

15. A system for providing on-demand, dynamically composed services to a service consumer from a service provider, the system comprising:
a computing platform having a processor configured to perform a logical process;
at least one client service request received from a service consumer by the computing platform, the service request having an information payload upon which the requested service is to be performed;
a hub subsystem of the computing platform, responsive to the received service request:
decomposing by a computing platform the requested service into a plurality of essential or primitive functions;
dynamically composing by a computing platform a sequence of a plurality of service elements corresponding to the plurality of essential or primitive functions to be employed to accomplish the service, wherein the composing employs a function call and return decomposition and recomposition paradigm;
creating by a computing platform a control header and information payload, the control header encapsulating the sequence of the plurality of the service elements; and
repeatedly dispatching by a computing platform the control header to each service element in the composed sequence until all service elements have processed the information payload; and a processed payload returned to the service consumer from the hub subsystem responsive to completion of dispatching the control header to each of the service elements in the composed sequence.

16. The system as set forth in claim 15 wherein the control header comprises an Extensible Markup Language data structure.

17. The system as set forth in claim 16 wherein the hub subsystem comprises a canonical messaging interface for receiving the service request.

18. The system as set forth in claim 16 wherein the hub subsystem comprises a canonical messaging interface for dispatching the control header.

19. The system as set forth in claim 15 further comprising:
a registry of service elements and the functions portion of the hub subsystem; and
a registry updater portion of the hub subsystem removing a registered service element from the registry responsive to receipt of a deregistration request.

20. The system as set forth in claim 15 wherein the hub subsystem comprises a messaging broker, a dynamic service composer, a service element registry, a delivery element, a dispatcher element, and a registration element.

21. The system as set forth in claim 20 wherein the dispatcher element and the delivery element are provided with a canonical messaging interface.

22. The system as set forth in claim 15 wherein the plurality of service elements are provided with a canonical messaging interface.

23. The system as set forth in claim 15 wherein the hub and service elements are provided with compatible canonical messaging interfaces.

24. A method performed by a computing platform comprising:
receiving by a computing platform a request for a service to be performed from a service consumer, the request having an information payload upon which the requested service is to be performed;
responsive to receipt of the request:
decomposing by a computing platform the requested service into a plurality of essential or primitive functions;
dynamically composing by a computing platform a sequence of a plurality of service elements corresponding to the plurality of essential or primitive functions to be employed to accomplish the service;
creating by a computing platform a control header and information payload, the control header encapsulating the sequence of the plurality of service elements;
repeatedly dispatching by a computing platform the control header to each service element in the composed sequence until all service elements have processed the information payload;
responsive to the dispatching so all service elements, returning the processed information payload to the service consumer;
maintaining a registry of service elements and the functions; and
upon receipt of a registration from a new service element, adding the service element to the registry for subsequent use in performing dynamically composed services.

* * * * *